United States Patent [19]

Nagou et al.

[11] Patent Number: 4,791,144

[45] Date of Patent: Dec. 13, 1988

[54] MICROPOROUS FILM AND PROCESS FOR PRODUCTION THEREOF

[75] Inventors: Satoshi Nagou, Tokuyama; Shunichi Nakamura, Hiraki, both of Japan

[73] Assignee: Tokuyama Soda Kabushiki Kaisha, Yamaguchi, Japan

[21] Appl. No.: 61,221

[22] Filed: Jun. 12, 1987

[30] Foreign Application Priority Data

Jun. 12, 1986 [JP] Japan ................................ 61-135018
Jun. 13, 1986 [JP] Japan ................................ 61-136153

[51] Int. Cl.$^4$ .................... B29C 67/20; B29C 55/02; C08F 10/00; C08J 9/26
[52] U.S. Cl. ................................ 521/90; 210/500.36; 264/41; 264/49; 264/288.8; 264/289.6; 429/254; 521/91; 521/134; 521/143
[58] Field of Search ............. 264/41, 49, 288.8, 289.6; 429/254; 521/90, 91, 134, 143

[56] References Cited

U.S. PATENT DOCUMENTS 4,613,643 9/1986 Nakamura et al. ............... 264/41 X

FOREIGN PATENT DOCUMENTS 49-119970 11/1974 Japan .
58-32171 7/1983 Japan .

Primary Examiner—Philip Anderson
Attorney, Agent, or Firm—Sherman and Shalloway

[57] ABSTRACT

Disclosed is a microporous polyproplene film comprising a propylene homopolymer, a copolymer of propylene with other copolymerizable monomer or a blend thereof, which has an intrinsic viscosity ($\eta$) of 1.9 to 3.0 dl/g, especially 2.0 to 3.0 dl/g, as measured at 135° C. in tetralin, said microporous film having a network structure comprising intercommunicating pores having a maximum pore size smaller than $1\mu$ and an average pore size of 0.005 to $0.6\mu$ and having a porosity of 30 to 90%, an air permeability of 5 to 500 sec/100 cc and a thickness of 5 to $200\mu$, said microporous film being molecularly oriented by stretching.

30 Claims, No Drawings

MICROPOROUS FILM AND PROCESS FOR PRODUCTION THEREOF

BACKGROUND OF THE INVENTION

(1) Field of the Invention

The present invention relates to a microporous drawn film excellent in air permeability and moisture permeability and a process for the preparation thereof. The microporous drawn film of the present invention is preferably used as a material for a separator of a battery, a capacitor, a waste water disposal, a purification of water, an artificial leather, an artificial paper, a heat-insulating packaging film, a moisture absorbent packaging film, a bandage, an operating gown, a mask, a back-sheet of a plaster, a sterile packaging film and the like.

(2) Description of the Prior Art

The preparation of a porous film has been tried by incorporating a filler having a small particle size into polypropylene, forming a film by melt molding and extracting the filler from the film. This process, however, is defective in that if a large amount of the filler is incorporated in order to increase the porosity, because of secondary aggregation of the filler it is difficult to form a uniform porous structure, or the extraction efficiency is low and the porosity is insufficient.

Various improvements have been made for eliminating this disadvantage. For example, Japanese Patent Publication No. 32171/83 proposes a process for the preparation of a porous film, which comprises melt-forming a film from a composition comprising 10 to 60% by volume of a polyolefin resin having a weight average molecular weight lower than 300,000 and a number average molecular weight of at least 15,000, 7 to 42% by volume of an inorganic fine powder and 30 to 75% by volume of an organic liquid and extracting the organic liquid from the formed film. According to this process, a practically applicable porous film can be obtained if polyethylene is used as the resin, but improvements are desired in strength, porosity, pore size uniformity and heat resistance of the obtained film. Moreover, if polypropylene is used in the above-mentioned process in order to impart inherent excellent properties of polypropylene to the resulting film, the film-forming operation cannot be performed conveniently and a porous film composed substantially of polypropylene cannot be obtained.

Furthermore, there is known a process in which pores are formed by stretching an inorganic filler-containing film (see Japanese Patent Application Laid-Open Specification No. 119970/74). This process is advantageous in that a required porosity can be attained without extracting a filler or process oil and the obtained film is satisfactory in strength and heat resistance. However, if a fine filler having a particle size smaller than 1μ is used, secondary aggregation cannot be prevented. For example, requirements for a separator of a battery or a capacitor, such as a maximum pore size smaller than 1μ and good air permeability, good moisture permeability and good pore size uniformity, cannot be satisfied according to this process.

U.S. Pat. No. 4,613,643 to Nakamura, one of us, et al. discloses a process in which a film of an elastomer containing an inorganic filler is stretched to form pores. According to this process, an intended porous film is obtained when the resin component contains an elastomer, but if polypropylene is used as the resin component, it is difficult to obtain a porous polypropylene film having a maximum pore size smaller than 1μ and a large porosity.

SUMMARY OF THE INVENTION

It is therefore a primary object of the present invention to provide a microporous film composed of polypropylene, which has a network structure comprising intercommunicating pores having a maximum pore size smaller than 1μ and an average pore size of 0.005 to 0.6μ and a void ratio of 30 to 90%.

Another object of the present invention is to provide an excellent microporous film having an air permeability of 5 to 500 sec/100 cc and a moisture permeability of 1,000 to 5,000 g/m² 24 hours.

Still another object of the present invention is to provide a specific combination of additives for dispersing a filler uniformly in a resin and a process for preparing a microporous film from a resin composition comprising this combination of additives.

Other objects of the present invention will become apparent from the following description.

Under the above-mentioned background, we considered it necessary to develop a microporous film capable of resisting a high temperature for a separator of a lithium battery or the like while using polypropylene as the film material. Based on this premise, we made various investigations, and as the result, it was found that control of the pore size of the resulting film is greatly influenced by the kind of the filler used and the filler-additive combination. We furthered our research based on this finding and we succeed in providing a novel microporous polypropylene film having excellent properties. Thus, we have now completed the present invention.

More specifically, in accordance with one fundamental aspect of the present invention, there is provided a microporous polypropylene film comprising a propylene homopolymer, a copolymer of propylene with other copolymerizable monomer or a blend thereof, which has an intrinsic viscosity $(\eta)$ of 1.9 to 3.0 dl/g, especially 2.0 to 3.0 dl/g, as measured at 135° C. in tetralin, said microporous film having a network structure comprising intercommunicating pores having a maximum pore size smaller than 1μ and an average pore size of 0.005 to 0.6μ and having a porosity of 30 to 90%, an air permeability of 5 to 500 sec/100 cc and a thickness of 5 to 200μ, said microporous film being molecularly oriented by stretching.

This novel microporous polypropylene film of the present invention can be prepared according to processes as described below.

More specifically, in accordance with another aspect of the present invention, there is provided a process for the preparation of a microporous polypropylene film, which comprises melt-forming into a sheet or film a mixture comprising (a) 20 to 80% by weight of a propylene homopolymer, a copolymer of propylene with other copolymerizable monomer or a blend thereof, which has an intrinsic viscosity $(\eta)$ of 1.9 to 3.0 as measured at 135° C. in tetralin, (b) 80 to 20% by weight of at least one siliceous filler selected from the group consisting of silica, silicates and inorganic composites thereof, said siliceous filler having an average particle size smaller than 1μ, (c) a polyester type plasticizer and/or an epoxy type plasticizer in an amount of 40 to 10% by weight based on the sum of the components (a) and (b), and (d) a silane type dispersant in an amount of 0.01 to 5% by weight based on the sum of the components (a), (b) and (c), and stretching the sheet or film at an area stretching ratio of 1.5 to 30.

In accordance with still another aspect of the present invention, there is provided a process for the preparation of a microporous polypropylene film, which comprises melt-forming into a sheet or film a mixture comprising (a) 30 to 70% by weight of a propylene homopolymer, a copolymer of propylene with other copolymerizable monomer or a blend thereof, which has an intrinsic viscosity ($\eta$) of 1.9 to 3.0 as measured at 135° C. in tetralin, (b') 70 to 30% by weight of at least one nonsiliceous filler selected from the group consisting of oxides, hydroxides, carbonates and sulfates of metals of groups IIA, IIIA and IVB of the Periodic Table, said nonsiliceous filler having an average particle size smaller than 1$\mu$, (c) a polyester type plasticizer and/or an epoxy type plasticizer in an amount of 0.1 to 5% by weight based on the sum of the components (a) and (b'), (e) a liquid or waxy hydrocarbon polymer in an amount of 0 to 10% by weight based on the sum of the components (a) and (b'), and (f) a fluorine type surface active agent in an amount of 0.01 to 5% by weight based on the sum of the components (a) and (b'), and stretching the sheet or film at an area stretching ratio of 1.5 to 30.

DETAILED DESCRIPTION OF THE PREFERRED EMBODIMENTS

One of the characteristic features of the present invention resides in the material of the microporous polypropylene film. Namely, in the present invention, it is indispensable that the microporous film should be composed of a propylene homopolymer, a copolymer of propylene with other copolymerizable monomer or a blend thereof, which has an intrinsic viscosity ($\eta$) of 1.9 to 3.0 dl/g, especially 2.0 to 3.0 dl/g, as measured at 135° C. in tetralin.

The kind of the copolymer of propylene with other copolymerizable monomer is not particularly critical, so far as the intrinsic viscosity is 1.9 to 3.0 dl/g as measured at 135° C. in tetralin. However, a copolymer comprising at least 90% by weight of propylene and up to 10% by weight of other copolymerizable monomer is ordinarily preferred. The kind of other copolymerizable monomer is not particularly critical, and known monomers can be used. However, olefins having 2 to 8 carbon atoms are generally preferred and ethylene and butene are especially preferred.

The reason why the polymer having an intrinsic viscosity of 1.9 to 3.0 dl/g as measured at 135° C. in tetralin is used as the film-forming material in the present invention is as follows.

If the intrinsic viscosity is lower than the lower limit, when a film or sheet obtained by melt-forming a composition comprising a resin component, a filler and a specific additive is stretched according to the present invention, the stretching ratio cannot be elevated to a desired level and an industrially preferable microporous polypropylene film cannot be obtained. On the contrary, if the intrinsic viscosity exceeds the upper limit, no good moldability is attained at the step of melt-forming a sheet or film and uniform stretching is not attained at the stretching step.

In order to impart a good heat resistance to the resulting microporous film, in the present invention, it is indispensable that a polypropylene resin as described above should be used as the film-forming material. In the present invention, if a polypropylene resin as described above is used as the film-forming material, a high heat resistance can be imparted to the resulting film, and furthermore, the porosity can be increased and the air permeability characteristics can be highly improved.

The microporous polypropylene film of the present invention has a network structure comprising intercommunicating pores having a maximum pore size smaller than 1$\mu$ and an average pore size of 0.005 to 0.6$\mu$ and has a porosity of 30 to 90%, preferably 35 to 80%, and a thickness of 5 to 200$\mu$. By dint of this structural features, the air permeability of the microporous polypropylene film of the present invention is maintained at 5 to 500 sec/cc. This preferred air permeability has a close relation to the feature that the average particle size is small and uniform and the porosity is large. Furthermore, this preferred air permeability has a close relation to the moisture permeability, and the moisture permeability of the microporous polypropylene film is generally in the range of 1,000 to 5,000 g/m$^2$ 24 hours.

The above-mentioned maximum pore size, average pore size, porosity, air permeability and film thickness are correlated to one another, and therefore, it is not always proper to point out what disadvantages are brought about when these factors independently deviate from the upper or lower limits. However, the following can generally be said.

If the maximum pore size exceeds 1$\mu$, when the porous film is used for a cell separator, a separator of a battery or a capacitor, there is a fear of formation of a short circuit and the denseness of pores is degraded. If the average pore size is smaller than the lower limit, the porosity and air permeability become insufficient, and if the average pore size exceeds the upper limit, the maximum pore size exceeds 1$\mu$ and the air permeability becomes too high, that is, the air permeability characteristics are degraded. If the porosity is smaller than the lower limit, the air permeability characteristics are degraded and when the porous film is used for a cell separator, a battery separator or a capacitor, the electric resistance tends to increase. If the porosity exceeds the upper limit, the strength of the film is reduced and there arises a fear of formation of a short circuit. The upper limit of the porosity is influenced by the amount incorporated of the filler in the industrial preparation process described below. Therefore, increase of the porosity beyond the upper limit is not preferred from the viewpoint of the industrial production. The deviation of the air permeability determining the air permeability characteristics from the above-mentioned upper or lower limit is not preferred for the same reasons as described above with respect to the porosity. From the industrial viewpoint, it is difficult to prepare a porous film having a thickness smaller than 5$\mu$, and if such a thin film is used for a battery separator, it is difficult to impregnate the porous film with an electrolyte in such an amount as exerting a sufficient battery performance (output). If the thickness of the porous film exceeds the upper limit, it is difficult to reduce the size of an apparatus in which the porous film is used, and handling of such an apparatus is very troublesome.

In general, the porous polypropylene film has a water pressure resistance of 10,000 to 50,000 mmH$_2$O. However, in the case where such a high water pressure resistance is not preferred for the microporous film, the water pressure resistance can be easily reduced, for example, to almost 0 mmH$_2$O by a proper post treatment. For example, the water pressure resistance can be reduced by immersing the porous polypropylene film in an aqueous solution containing a small amount, for example, 1 to 3%, of a nonionic surface active agent having an HLB value of 10 to 15, or by incorporating this surface active agent into the film-forming starting material.

In the present invention, it is indispensable that the microporous polypropylene film should not only have the above-mentioned properties but also be stretched. The pores of the microporous polypropylene film have a high uniformity, but as is apparent from the description of the preparation process given hereinafter, this uniformity is produced by stretching a polypropylene film containing a large amount of a filler. In order to produce uniform pores, not only combined use of an additive for uniformly dispersing the filler in polypropylene but also the stretching ratio is important.

It is preferred that the stretching ratio of the microporous polypropylene film of the present invention be an area stretching ratio of 1.5 to 30. It is not indispensable that the microporous film should be bi-axially stretched, but it is sufficient if the microporous film is uni-axially stretched. In case of uni-axial stretching (longitudinal direction), it is preferred that the stretching ratio be at least 1.5, especially 3 to 7. In case of bi-axial direction, the stretching ratio in the longitudinal direction is at least 1.2, preferably at least 1.5, and the stretching ratio in the lateral direction is at least 1.2, preferably at least 1.5. It is especially preferred that the stretching ratio in the longitudinal direction be 2 to 5 and the stretching ratio in the lateral direction be 2 to 7.

In the present invention, by stretching the filler-containing polypropylene film, fine pores are formed in the periphery of the filler. In the present invention, the stretched microporous polypropylene film in the filler-containing state can be recovered as an intended product, or the filler may be extracted according to need to obtain an intended product. An appropriate known extraction method can be adopted according to the kind of the filler used. For example, in the case where a siliceous filler is used, extraction may be performed by using an aqueous solution of a caustic alkali such as sodium hydroxide or potassium hydroxide. In case of an inorganic filler other than the siliceous filler, extraction can be performed by using an aqueous solution of an acid such as hydrochloric acid, formic acid or acetic acid or a mixed solution of such an acid solution and a solution of an alcohol such as methanol or ethanol.

The process for the preparation of the microporous polypropylene film of the present invention is not particularly critical. However, the microporous polypropylene film of the present invention cannot be prepared according to the customary process in which a resin is mixed with a filler, a film is formed from the mixture by melt molding and the filler, is extracted from the film. Selection of specific kinds of polypropylene, filler and additive, specific combination of these ingredients and specific incorporation ratios of these ingredients are indispensable for the preparation of the microporous polypropylene film of the present invention. Typical instances of the process for the preparation of the microporous polypropylene film of the present invention will now be described.

Process (A)

The microporous polypropylene film of the present invention is prepared by a process comprising melt-forming into a sheet or film a mixture comprising (a) 20 to 80% by weight of propylene homopolymer, a copolymer of propylene with other copolymerizable monomer or a blend thereof, which has an intrinsic viscosity ($\eta$) of 1.9 to 3.0 as measured at 135° C. in tetralin, (b) 80 to 20% by weight of at least one siliceous filler selected from the group consisting of silica, silicates and inorganic composites thereof, said siliceous filler having an average particle size smaller than $1\mu$, (c) a polyester type plasticizer and/or an epoxy type plasticizer in an amount of 40 to 10% by weight based on the sum of the components (a) and (b), and (d) a silane type dispersant in an amount of 0.01 to 5% by weight based on the sum of the components (a), (b) and (c), and stretching the sheet or film at an area stretching ratio of 1.5 to 30.

As described hereinbefore, it is important that the polypropylene component (a) used should have an intrinsic viscosity of 1.9 to 3.0 as measured at 135° C. in tetralin.

Since the maximum pore size of the obtained microporous film should be smaller than $1\mu$, the particle size of the siliceous filler (b) should be smaller than $1\mu$, preferably smaller than $0.5\mu$. It is difficult to disperse a large amount of the siliceous filler (b) having a particle size smaller than $1\mu$ uniformly into the component (a). In order to eliminate this disadvantage, it is important that specific amounts of a specific plasticizer and a specific dispersant should be incorporated when the components (a) and (b) are mixed. More specifically, a polyester type plasticizer and/or an epoxy type plasticizer (c) in an amount of 40 to 10% by weight based on the sum of the components (a) and (b) and a silane type dispersant (d) in an amount of 0.01 to 5% by weight based on the sum of the components (a), (b) and (c) are added to the components (a) and (b).

The mixing ratio between the components (a) and (b) is important for preparing a microporous polypropylene film having the above-mentioned characteristic properties advantageously on an industrial scale. More specifically, if the amount of the component (b) is smaller than the lower limit, formation of pores is insufficient in the obtained porous polypropylene film and a film having the above-mentioned characteristic properties cannot be obtained. If the amount of the component (b) is larger than the upper limit, molding is insufficient at the step of forming a sheet or film and sufficient stretching of the sheet or film is impossible, with the result that the porosity becomes insufficient.

The amounts added of the components (c) and (d) have great influences on the physical properties of the obtained microporous film and the moldability of the sheet or film. If the amount of the plasticizer (c) is larger than 40% by weight based on the sum of the components (a) and (b), when the starting mixture is melt-formed into a sheet or film, partial flowing of the plasticizer is caused and control of the thickness or width of the sheet or film is impossible. On the other hand, if the amount of the plasticizer is smaller than 10% by weight based on the sum of the components (a) and (b), the compatibility with the component (a) is degraded, and a homogeneous mixture is hardly obtained and the filler is not sufficiently dispersed because of aggregation, with the result that a porous film having fine and uniform pores cannot be obtained.

If the amount of the component (d) is smaller than 0.01% by weight based on the sum of the components (a), (b) and (c), dispersion of the filler (b) is insufficient and a porous film having uniform and fine pores cannot be obtained. In contrast, if the amount of the component (d) is larger than 5% by weight based on the sum of the components (a), (b) and (c), the formed sheet or film is hard and brittle and stretching becomes difficult, and it is difficult to obtain a microporous polypropylene film as intended in the present invention.

As pointed out hereinbefore, the siliceous filler is selected from the group consisting of silica, silicates and composites thereof, and these fillers are known and the known fillers can be used without any limitation. Silica represented by hydrous silicic acid and silicic anhydride, silicates such as aluminum silicate, calcium silicate and magnesium silicate, and composites such as siliceous sand, clay and talc are preferably used as the siliceous filler. Silica and silicates as described above are especially preferred.

Various known polyester type plasticizers and epoxy type plasticizers for synthetic resins can be used as the plasticizer (c) in the present invention without any limitation.

Products obtained by esterification of a linear or aromatic ring-containing dibasic or tribasic acid having 4 to 8 carbon atoms with a linear dihydric alcohol having 2 to 5 carbon atoms are preferred as the polyester type plasticizer. More specifically, polyester compounds comprising a dibasic or tribasic acid such as sebacic acid, adipic acid, phthalic acid, azelaic acid or trimellitic acid and ethylene glycol, propylene glycol, butylene glycol, neopentyl glycol or a long-chain alkylene glycol are preferred, and polyester compounds comprising adipic acid or sebacic acid and propylene glycol, butylene glycol or a long-chain alkylene glycol are especially preferred.

Products obtained by epoxidizing a double bond of a monobasic linear unsaturated acid having 16 to 18 carbon atoms are preferred as the epoxy type plasticizer. For example, epoxidized soybean oil and epoxidized linseed oil are especially preferred.

These plasticizers may be used singly, or they may be used in the form of mixtures of two or more of them.

Known silane type dispersants for surface-treating siliceous fillers for resins can be used as the silane type dispersant without any limitation. As preferred examples, there can be mentioned alkoxysilane compounds represented by the general formula $R_{4-n}Si(OR')_n$ in which R and R' stand for an alkyl group such as a methyl, ethyl or propyl group and n is an integer, especially 2 or 3, and methyltrimethoxysilane, ethyltrimethoxysilane, methyldimethoxysilane and ethyldimethoxysilane in which R and R' stand for a methyl or ethyl group are especially preferred.

The method for mixing the components (a), (b), (c) and (d) is not particularly critical. For example, the foregoing four components are simultaneously added and mixed by a mixer such as a super mixer or a Henschel mixer, or there may be adopted a method in which the components (c) and (d) are added to the component (b) in advance, polypropylene is melt-kneaded with the resulting mixture, for example, by a monoaxial or biaxial screw extruder and the extrudate is cut to form pellets.

In mixing the foregoing components, it is often preferred that known additives such as a colorant, a lubricant, an antioxidant and a deterioration-preventing agent be added, so far as the preparation of the intended microporous polypropylene film is not inhibited.

The microporous polypropylene film of the present invention is prepared by melt-forming the above-mentioned mixture into a sheet or film and stretching the sheet or film.

The method for melt-forming the mixture into a sheet or film is not particularly critical, but the inflation molding method or the extrusion molding method using a T-die is generally preferred. Then, the sheet or film is uni-axially stretched according to the roll stretching method, or after this uni-axial stretching, the stretched film is subsequently drawn in the lateral direction by a tenter stretching machine, an air inflation stretching machine or a mandrel stretching machine. Alternatively, there may be adopted a method in which the sheet or film is simultaneously stretched in the longitudinal and lateral directions. The stretching temperature is generally in the range of from room temperature to the melting point of polypropylene, and a temperature lower by 10° to 60° C. than the melting point of polypropylene is preferred. By this stretching operation, a microporous polypropylene film having the above-mentioned properties is obtained.

The so-obtained microporous polypropylene film contains the siliceous filler. The microporous polypropylene film can be applied in this state to the above-mentioned various uses. However, if it is desired to further reduce the electric resistance, it is preferred that the siliceous filler be extracted and removed by a post treatment. Extraction can be accomplished by immersing the film in an aqueous solution containing, for example, 10 to 40%, of a caustic alkali such as sodium hydroxide or potassium hydroxide at 10° to 60° C. for 1 hour to 2 days.

It is preferred that the microporous film obtained by stretching or the microporous film obtained by extracting the filler from the stretched film be thermally set by heating the film at a temperature of, for example, 100° to 160° C. and be then cooled to room temperature. Furthermore, in order to improve the printability or adhesiveness, it is preferred that the film be subjected to a corona discharge surface treatment.

In the microporous polypropylene film of the present invention, since polypropylene is molecularly oriented or further thermally set, the heat resistance of the film is highly improved and the mechanical strength is also improved. Especially, when the thermal setting treatment is performed, the dimension stability at room temperature and an elevated temperature is prominently improved.

Process (B)

The microporous polypropylene film of the present invention can also be prepared by a process comprising melt-forming into a sheet or film a mixture comprising (a) 30 to 70% by weight of a propylene homopolymer, a copolymer of propylene with other copolymerizable monomer or a blend thereof, which has an intrinsic viscosity ($\eta$) of 1.9 to 3.0 as measured at 135° C. in tetralin, (b') 70 to 30% by weight of at least one nonsiliceous filler selected from the group consisting of oxides, hydroxides, carbonates and sulfates of metals of groups IIA, IIIA and IVB of the Periodic Table, said nonsiliceous filler having an average particle size smaller than 1μ, (c) a polyester type plasticizer and/or an epoxy type plasticizer in an amount of 0.1 to 5% by weight based on the sum of the components (a) and (b'), (e) a liquid or waxy hydrocarbon polymer in an amount of 0 to 10% by weight based on the sum of the components (a) and (b'), and (f) a flourine type surface active agent in an amount of 0.01 to 5% by weight based on the sum of the components (a) and (b'), and stretching the sheet or film at an area stretching ratio of 1.5 to 30.

This process is different from the above-mentioned process (A) in the kind of the filler used. Because of this difference of the kind of the filler used, the mixing ratio and the kind and amount of the additive become different from those in the process (A). The filler (b') used in the process (B) is at least one nonsiliceous filler selected from the group consisting of oxides, hydroxides, carbonates and sulfates of metals of groups IIA, IIIA and IVB of the Periodic Table, which has an average particle size smaller than $1\mu$, preferably smaller than $0.5\mu$. Known fillers of this type for synthetic resins can be used without any limitation. Preferred examples will now be described. Alkaline earth metals such as calcium, magnesium and barium are preferred as the metal of group IIA of the Periodic Table, boron and aluminum are preferred as the metal of group IIIA of the Periodic Table, and titanium, zirconium and hafnium are preferred as the metal of group IVB of the Periodic Table. Oxides, hydroxides, carbonates and sulfates of these metals can be used without any limitation. As especially preferred examples of the filler (b') used in the present invention, there can be mentioned oxides such as calcium oxide, magnesium oxide, barium oxide, aluminum oxide, boron oxide, titanium oxide and zirconium oxide, carbonates such as calcium carbonate, magnesium carbonate and barium carbonate, hydroxides such as magnesium hydroxide, calcium hydroxide and aluminum hydroxide, and sulfates such as calcium sulfate, barium sulfate and aluminum sulfate.

The mixing ratio between the components (a) and (b') is important for preparing a microporous polypropylene film having the above-mentioned properties advantageously on an industrial scale. If the amount of the component (b') is smaller than the lower limit, formation of pores is not sufficient in the obtained porous film and the intended porosity cannot be attained. If the amount of the component (b') exceeds the upper limit, the sheet or film melt-forming property is degraded and stretching cannot be performed sufficiently, and it is difficult to impart a sufficient porosity to the resulting film.

As described above with reference to the process (A), it is difficult to uniformly disperse a large amount of the component (b') in the component (a). In order to eliminate this disadvantage, in the process (B), it is important that specific amounts of a specific plasticizer and a specific surface active agent should be added to the components (a) and (b') when they are mixed. More specifically, a polyester type plasticizer and/or an epoxy type plasticizer (c) is added in an amount of 0.1 to 5% by weight based on the sum of the components (a) and (b') and a fluorine type surface active agent (f) is added in an amount of 0.01 to 5% by weight based on the sum of the components (a) and (b').

The amounts added of the components (c) and (f) have larger influences on the properties of the obtained microporous film than the mixing ratio between the components (a) and (b'). If the amounts added of the components (c) and (f) are smaller than the lower limits, good dispersion of the filler is attained and a microporous film having uniform pores cannot be obtained. If the amount added of the component (c) exceeds the upper limit, partial flowing of the plasticizer is caused at the step of melt-forming a sheet or film, and control of the thickness and width of the obtained film becomes impossible and the intended microporous film cannot be obtained. If the amount added of the component (f) exceeds the upper limit, a gas is generated at the step of melt-forming a sheet or film, and control of the pore size in the obtained microporous film becomes impossible.

In the process (B), it is generally preferred that a liquid or waxy hydrocarbon polymer (e) be added in an amount of up to 10% by weight based on the sum of the components (a) and (b'), though addition of the component (e) is not indispensable. However, if the amount added of the component (e) exceeds 10% by weight based on the sum of the component (a) and (b'), partial flowing of the component (e) like the above-mentioned partial flowing of the plasticizer is caused at the step of melt-forming a sheet or film. Accordingly, the amount added of the component (e) should be up to 10% by weight based on the sum of the components (a) and (b').

The same polyester type plasticizer and/or epoxy type plasticizer as described above with reference to the process (A) can be used as the component (c), though the amount added is different from that in the process (A).

Any liquid or waxy hydrocarbon polymer can be used as the component (e) without any limitation. In general, however, saturated and unsaturated hydrocarbons such as polybutadiene, polybutene and polyisoprene, polymers obtained by introducing hydroxyl groups into terminals of these hydrocarbon polymers and polyhydroxyl hydrocarbon polymers obtained by hydrogenating these hydroxyl group-introduced polymers are preferably used as the component (e).

Known fluorine type surface active agents can be used as the component (f) without any limitation. However, there are preferably used fluorine type anionic surface active agents such as potassium and ammonium salts of alkylcarboxylic or alkylsulfonic acids having 6 to 8 carbon atoms, in which some or all of hydrogen atoms in the alkyl group are substituted by fluorine atoms, fluorine type cationic surface active agents such as fluorinated alkyl quaternary ammonium iodides, and fluorine type nonionic surface active agents such as esters of fluorinated alkyl carboxylic or sulfonic acids with monohydric or polyhydric alcohols having 1 to 4 carbon atoms. As specific examples of the preferred fluorine type surface active agents, there can be mentioned fluorine type nonionic surface active agents such as fluorinated alkyl esters of fluorinated alkyl carboxylic or sulfonic acids with propyl alcohol or glycerol and fluorinated alkyl polyoxyethylene ethanols, fluorine type anionic surface active agents such as ammonium salts of perfluoroalkyl sulfonic acids, potassium salts of perfluoroalkyl sulfonic acids and potassium salts of perfluoroalkyl carboxylic acids, fluorine type cationic surface active agents such as perfluoroalkyl quaternary ammonium iodides, and fluorine type nonionic surface active agents such as perfluoroalkyl polyoxyethylene ethanols and fluorinated alkyl esters. A fluorinated hydrocarbon compound composed of a perfluoroalkyl quaternary ammonium iodide or fluorinated alkyl ester is especially preferred.

The method for mixing the components (a), (b'), (c) and (f), optionally with the component (e), the method for melt-forming a sheet or film from the mixture, the drawing method and other post-treating methods are the same as those described hereinbefore with respect to the process (A).

As is apparent from the foregoing description, since the microporous polypropylene film of the present invention is composed of a propylene homopolymer or a propylene-rich copolymer of propylene with other copolymerizable monomer, the microporous polypropylene film has a good heat resistance and is excellent in physical properties such as strength. Moreover, since the microporous film is drawn, physical properties such as strength are highly improved and there is formed a network structure comprising intercommunicating pores having a maximum pore size smaller than 1μ and an average pore size of 0.005 to 0.6μ. Furthermore, these pores are very uniform and the porosity is within the range of 30 to 90%. Still further, the air permeability is very good and in the range of from 5 to 500 sec/100 cc.

Accordingly, the microporous polypropylene film is advantageously used as a separator of a battery, a capacitor, an artificial leather, an artificial paper, a heat-insulating packaging film, a moisture absorbent-packaging film, a bandage, an operating gown, a mask, a back sheet of a plaster, a gas-purifying filter and the like.

The intrinsic viscosity of the material of the microporous polypropylene film of the present invention is 1.9 to 3.0 dl/g as measured at 135° C. in tetralin. The propylene homopolymer or copolymer may be used in the form of a mixture with a small amount, for example, up to 30% by weight, preferably up to 20% by weight, of other resin, so far as the intended objects of the present invention can be attained. For example, homopolymers or copolymers of α-olefins having 2 to 8 carbon atoms, other than propylene homopolymers or copolymers, such as polyethylene, polybutene, ethylene/propylene rubber and ethylene/butene rubber, are preferably used.

The present invention will now be described in detail with reference to the following examples that by no means limit the scope of the invention.

Incidentally, in the following examples and comparative examples, the physical properties of the films were measured and evaluated according to the following methods.

Maximum pore size

The maximum pore size was measured according to the methanol bubble point method.

Porosity (%)

The porosity was measured according to the specific gravity-measuring method and the mercury porosimeter method.

Air permeability (sec/100 cc)

The air permeability was measured according to the method of JIS P-8117 (Gurley air permeability).

Moisture permeability (g/m² 24 hours)

The moisture permeability was measured according to the method of JIS Z-0208.

Water pressure resistance (mmH$_2$O)

The water pressure resistance was measured according to the method of JIS K-6328.

Moldability

The moldability was determined based on the following standard by observing the unstretched sheet of film with the naked eye and touching it with the hand.

Good: no thickness unevenness and no surface concavity or convexity fair: slight thickness unevenness or slight surface concavity or convexity bad: conspicuous thickness unevenness and conspicuous surface concavity and convexity Dispersibility The stretched film was observed with the naked eye and it was checked whether or not there were present fish eyes.

good: no fish eyes bad: fish eyes were observed

Stretchability

The unstretched film was stretched uni-axially or bi-axially and the state of the stretching step was checked.

good: stretching was performed without cutting or breaking slightly bad: stretching was possible but an unstretched part was present bad: stretching was impossible because of cutting and breaking

EXAMPLES 1 THROUGH 11 AND COMPARATIVE EXAMPLES 1 THROUGH 5

A composition comprising a resin, a filler, a plasticizer and a silane type dispersant, as shown in Table 1, was mixed for 5 minutes by a super mixer, extruded in the form of a strand at 210° C. by a biaxial extruder and cut into pellets.

The obtained pellets were extruded at 230° C. through a die having a lip distance of 1 mm, which was attached to an extruder having a screw diameter of 30 mm and an L/D ratio of 24, and the extrudate was contacted with a cooler having a diameter of 100 mm, in which water maintained at 60° C. was circulated, and was taken out at a speed of 0.8 m/min to obtain a sheet-like product.

The sheet-like product was uni-axially stretched at 110° C. at a stretching ratio of 3 between two pairs of heated nip rolls differing in the rotation speed. Then, the uni-axially stretched film was stretched at 120° C. at a stretching ratio of 2 in the direction perpendicular to the uni-axially stretching direction by a tenter stretching machine (supplied by Bruckner) to obtain a microporous polypropylene film.

The physical properties of the obtained microporous polypropylene film are shown in Table 1.

The resins, fillers, plasticizers and silane type dispersants used are described below.

Polypropylene

PN-120 supplied by Tokuyama Soda, density=0.91 g/cm³, intrinsic viscosity=2.38 dl/g as measured at 135° C. in tetralin, melting point=166° C.

Propylene-ethylene copolymer

MS-624 supplied by Tokuyama Soda, density=0.90 g/cm³, intrinsic viscosity=2.28 dl/g as measured at 135° C. in tetralin, melting point=163° C. ethylene content=4.7% by weight Anhydrous silica Rheolosil 202 supplied by Tokuyama Soda, spherical shape having average particle size of 0.02μ

White carbon (hydrous silica)

Tokusil U supplied by Tokuyama Soda, spherical shape having average particle size of 0.03μ

Clay (hydrous aluminum silicate)

Bargus Clay #10 supplied by Shiraishi Calcium, average particle size=0.5μ

Calcium silicate

SP-10 supplied by Tokuyama Soda, average particle size=0.03μ

Anhydrous aluminum silicate

TYSIN supplied by Shiraishi Calcium, average particle size=0.8μ

Polyester type plasticizer

PN-150 supplied by Adeca-Argus
Epoxy type plasticizer
 Epoxisizer W100EL (epoxidized oil) supplied by Dainippon Ink Kagaku
Methyltrimethoxysilane (silane type dispersant)

TSL 8113 supplied by Toshiba Silicone
Methyltriethoxysilane (silane type dispersant)
 TSL 8123 supplied by Toshiba Silicone
Methyldimethoxysilane (silane type dispersant)
 TSL 8117 supplied by Toshiba Silicone

TABLE 1

| | Resin | | Filler | | | Plasticizer | | Silane Type Dispersant | | Mold-ability | Dispersibility of Filler | Uniform Stretchability |
|---|---|---|---|---|---|---|---|---|---|---|---|---|
| | Kind | amount(%) by weight | Kind | average particle size | amount(%) by weight | kind | amount(%) by weight | kind | amount(%)*1 by weight | | | |
| Example 1 | polypropylene | 40 | anhydrous silica | 0.02 | 30 | polyester type plasticizer | 30 | methyl-trimethoxy-silane | 1 | good | good | good |
| Example 2 | propylene/ethylene copolymer | 40 | anhydrous silica | 0.02 | 30 | polyester type plasticizer | 30 | methyl-trimethoxy-silane | 1 | good | good | good |
| Example 3 | polypropylene | 40 | white carbon | 0.03 | 30 | polyester type plasticizer | 30 | methyl-trimethoxy-silane | 1 | good | good | good |
| Example 4 | polypropylene | 40 | clay | 0.5 | 30 | polyester type plasticizer | 30 | methyl-trimethoxy-silane | 1 | good | good | good |
| Example 5 | polypropylene | 60 | anhydrous silica | 0.02 | 20 | polyester type plasticizer | 20 | methyl-trimethoxy-silane | 1 | good | good | good |
| Example 6 | polypropylene | 40 | anhydrous silica | 0.02 | 30 | epoxy type plasticizer | 30 | methyl-trimethoxy-silane | 1 | good | good | good |
| Example 7 | polypropylene | 40 | anhydrous silica | 0.02 | 30 | polyester type plasticizer / epoxy type plasticizer | 15 / 15 | methyl-trimethoxy-silane | 1 | good | good | good |
| Example 8 | polypropylene | 40 | anhydrous silica | 0.02 | 30 | polyester type plasticizer | 30 | methyl-triethoxy-silane | 1 | good | good | good |
| Example 9 | polypropylene | 40 | anhydrous silica | 0.02 | 30 | polyester type plasticizer | 30 | methyldi-methoxysilane | 1 | good | good | good |
| Example 10 | polypropylene | 40 | calcium silicate | 0.03 | 30 | polyester type plasticizer | 30 | methyl-methoxysilane | 1 | good | good | good |
| Example 11 | polypropylene | 40 | aluminum silicate | 0.8 | 30 | polyester type plasticizer | 30 | methyl-methoxysilane | 1 | good | good | good |
| Comparative Example 1 | polypropylene | 14 | anhydrous silica | 0.02 | 43 | polyester type plasticizer | 43 | methyl-methoxysilane | 1 | good | good | drawing impossible |
| Comparative Example 2 | polypropylene | 52 | anhydrous silica | 0.02 | 40 | polyester type plasticizer | 8 | methyl-methoxysilane | 1 | bad | bad | — |
| Comparative Example 3 | polypropylene | 31 | anhydrous silica | 0.02 | 23 | polyester type plasticizer | 46 | methyl-methoxysilane | 1 | bad | — | — |
| Comparative Example 4 | polypropylene | 40 | anhydrous silica | 0.02 | 30 | polyester type plasticizer | 30 | — | — | good | bad | slightly bad |
| Comparative Example 5 | polypropylene | 40 | anhydrous silica | 0.02 | 30 | polyester type plasticizer | 30 | methyl-methoxysilane | 8 | good | good | drawing impossible |

| | Thickness (μ) | Maximum Pore Size (μ) | Porosity (%) | Gurley Air Permeability | Moisture Permeability | Water Pressure Resistance |
|---|---|---|---|---|---|---|
| Example 1 | 200 | 0.4 | 80 | 200 | 2539 | 33000 |
| Example 2 | 200 | 0.5 | 75 | 210 | 2300 | 31000 |
| Example 3 | 200 | 0.7 | 70 | 180 | 2100 | 18000 |
| Example 4 | 200 | 1.0 | 66 | 100 | 1500 | 10000 |

TABLE 1-continued

| | | | | | | | |
|---|---|---|---|---|---|---|---|
| Example 5 | 200 | 0.35 | 45 | 460 | 1100 | 37000 |
| Example 6 | 200 | 0.5 | 82 | 210 | 3100 | 35000 |
| Example 7 | 200 | 0.5 | 86 | 275 | 2980 | 34000 |
| Example 8 | 200 | 0.4 | 81 | 195 | 2950 | 31000 |
| Example 9 | 200 | 0.4 | 78 | 210 | 2800 | 29000 |
| Example 10 | 200 | 0.7 | 71 | 190 | 2300 | 16000 |
| Example 11 | 200 | 1.0 | 68 | 110 | 1600 | 10000 |
| Comparative Example 1 | — | — | — | — | — | — |
| Comparative Example 2 | — | — | — | — | — | — |
| Comparative Example 3 | — | — | — | — | — | — |
| Comparative Example 4 | 200 | 1.0 | 88 | 45 | 2500 | 10000 |
| Comparative Example 5 | — | — | — | — | — | — |

Note
*1% by weight based on the sum of the resin, filler and plasticizer

EXAMPLES 12 THROUGH 26 AND COMPARATIVE EXAMPLES 6 THROUGH 22

A microporous polypropylene film was prepared in the same manner as described in Example 1 except that a resin, a filler, a plasticizer and a fluorine type surface active agent were mixed at a ratio shown in Table 2. The physical properties of the obtained microporous film are shown in Table 2. The filler, plasticizer and fluorine type surface active agent are described below. Other components were the same as used in Example 1.

Calcium carbonate
  Hakuenka CCR supplied by Shiraishi Calcium, average particle size=0.08μ
Calcium carbonate
  Hakuenka O supplied by Shiraishi calcium, average particle size=0.03μ
Calcium carbonate
  Whiton P-10 supplied by Shiraishi Calcium, average particle size=3μ
Polyester type plasticizer
  Polysizer W2300 (adipic acid type polyester) supplied by Dainippon Ink Kagaku
Polyester type plasticizer
  Polysizer P202 (sebacic acid type polyester) supplied by Dainippon Ink Kagaku
Epoxy type plasticizer
  Epoxisizer W100EL (epoxidized oil) supplied by Dainippon Ink Kagaku
Epoxy type plasticizer
  Epoxisizer W121 (epoxidized fatty acid ester) supplied by Dainippon Ink Kagaku
Liquid or rubbery hydrocarbon polymer
  GI-2000 (hydroxyl-terminated polybutadiene) supplied by Nippon Soda
Fluorine type surface active agent
  Fluorad FC-430 (fluorinated alkyl ester) supplied by Sumitomo-3M
Fluorine type surface active agent
  Fluorad FC-135 (perfluoroalkyl quaternary ammonium iodide) supplied by Sumitomo-3M

TABLE 2

| | Resin | | Filler | | | polyester type plasticizer | | Plasticizer epoxy type plasticizer | | liquid or rubbery hydrocarbon polymer (% by weight) |
|---|---|---|---|---|---|---|---|---|---|---|
| | kind | % by weight | kind | % by weight | average particle size ($\mu$) | adipic acid type polyester (% by weight) | sebacic acid type polyester (% by weight) | epoxidized oil (% by weight) | epoxidized fatty acid ester (% by weight) | |
| Example 12 | polypropylene | 40 | calcium carbonate | 60 | 0.08 | 2 | — | — | — | — |
| Example 13 | polypropylene | 40 | calcium carbonate | 60 | 0.08 | — | 2 | — | — | — |
| Example 14 | polypropylene | 40 | calcium carbonate | 60 | 0.08 | 2 | — | 2 | — | — |
| Example 15 | polypropylene | 40 | calcium carbonate | 60 | 0.08 | — | — | — | — | 2 |
| Example 16 | polypropylene | 40 | calcium carbonate | 60 | 0.08 | — | — | — | — | 2 |
| Comparative Example 6 | polypropylene | 40 | calcium carbonate | 60 | 0.08 | 0.05 | — | — | — | — |
| Comparative Example 7 | polypropylene | 40 | calcium carbonate | 60 | 0.08 | 8 | — | — | — | — |
| Comparative Example 8 | polypropylene | 40 | calcium carbonate | 60 | 0.08 | — | — | 0.05 | — | — |
| Comparative Example 9 | polypropylene | 40 | calcium carbonate | 60 | 0.08 | — | — | 8 | — | — |
| Comparative Example 10 | polypropylene | 25 | calcium carbonate | 75 | 0.08 | 2 | — | — | — | — |
| Comparative Example 11 | polypropylene | 75 | calcium carbonate | 25 | 0.08 | 2 | — | — | — | — |
| Comparative Example 12 | polypropylene | 40 | calcium carbonate | 60 | 3 | 2 | — | — | — | — |
| Comparative Example 13 | polypropylene | 40 | calcium carbonate | 60 | 0.03 | 4 | — | — | — | — |
| Example 17 | polypropylene | 40 | calcium carbonate | 60 | 0.08 | — | — | 2 | — | — |
| Example 18 | polypropylene | 40 | calcium carbonate | 60 | 0.08 | 2 | — | — | — | — |
| Example 19 | polypropylene | 40 | calcium carbonate | 60 | 0.08 | — | — | 4 | — | — |
| Example 20 | polypropylene | 40 | calcium carbonate | 60 | 0.08 | 1 | — | 1 | — | — |
| Example 21 | polypropylene | 30 | calcium carbonate | 70 | 0.08 | 2 | — | — | — | — |
| Example 22 | polypropylene | 40 | calcium carbonate | 60 | 0.08 | 2 | — | — | — | — |
| Example 23 | polypropylene | 40 | calcium carbonate | 60 | 0.08 | 2 | — | — | — | 2 |
| Example 24 | propylene/ethylene copolymer | 40 | calcium carbonate | 60 | 0.08 | 2 | — | 2 | — | 2 |
| Example 25 | polypropylene | 40 | calcium carbonate | 60 | 0.03 | 4 | — | — | — | 2 |
| Example 26 | polypropylene | 40 | calcium carbonate | 60 | 0.08 | — | — | 2 | — | 2 |

TABLE 2-continued

| | lene | | | | | | | | | | | | | |
|---|---|---|---|---|---|---|---|---|---|---|---|---|---|---|
| Comparative Example 14 | polypropylene | 25 | calcium carbonate | 75 | — | 0.08 | 2 | — | — | — | — | — | — | 2 |
| Comparative Example 15 | polypropylene | 40 | calcium carbonate | 60 | — | 3 | 2 | — | — | — | — | — | — | 0.5 |
| Comparative Example 16 | polypropylene | 40 | calcium carbonate | 60 | — | 0.08 | 2 | — | — | — | — | — | — | 12 |
| Comparative Example 17 | polypropylene | 40 | calcium carbonate | 60 | — | 0.08 | 2 | — | — | — | — | — | — | 0.05 |
| Comparative Example 18 | polypropylene | 40 | calcium carbonate | 60 | — | 0.08 | 8 | — | — | — | — | — | — | 2 |
| Comparative Example 19 | polypropylene | 40 | calcium carbonate | 60 | — | 0.08 | 0.05 | — | — | — | — | — | — | 2 |
| Comparative Example 20 | polypropylene | 40 | calcium carbonate | 60 | — | 0.08 | 2 | — | — | — | — | — | — | 2 |
| Comparative Example 21 | polypropylene | 75 | calcium carbonate | 25 | — | 0.08 | 2 | — | — | — | — | — | — | 2 |
| Comparative Example 22 | polypropylene | | | | | | | | | | | | | |

| | Fluorine Type Surface Active Agent | | Mold-ability | Dispers-ibility | Stretch-ability | Thickness (μ) | Maximum pore size (μ) | Porosity (%) | Air permeability (sec/100 cc) | Moisture permeability (g/m² · 24 hrs) | Water pressure resistance (mm H₂O) |
|---|---|---|---|---|---|---|---|---|---|---|---|
| | fluorinated alkyl ester (% by weight) | perfluoroalkyl quaternary ammonium iodide (% by weight) | | | | | | | | | |
| Example 12 | 0.1 | — | good | good | good | 200 | 0.3 | 74 | 290 | 3000 | 24000 |
| Example 13 | 0.1 | — | good | good | good | 200 | 0.3 | 71 | 265 | 3000 | 22000 |
| Example 14 | — | 0.1 | good | good | good | 200 | 0.3 | 69 | 271 | 2900 | 26000 |
| Example 15 | 0.1 | — | good | good | good | 200 | 0.3 | 73 | 290 | 2800 | 27000 |
| Example 16 | 0.1 | — | good | good | good | 200 | 0.3 | 70 | 295 | 2900 | 26000 |
| Comparative Example 6 | 0.1 | — | good | bad | — | 200 | 4.6 | 66 | 200 | 1900 | 3000 |
| Comparative Example 7 | 0.1 | — | bad | bad | — | — | — | — | — | — | — |
| Comparative Example 8 | 0.1 | — | good | — | — | 200 | 4.1 | 65 | 210 | 1600 | 2800 |
| Comparative Example 9 | 0.1 | — | bad | bad | — | — | — | — | — | — | — |
| Comparative Example 10 | 0.1 | — | good | bad | — | 200 | 4.4 | 62 | 220 | 2000 | 3100 |
| Comparative Example 11 | 0.1 | — | bad | — | — | — | — | — | — | — | — |
| Comparative Example 12 | 0.1 | — | good | good | good | 200 | 0.2 | 6 | 80000 | 2 | 40000 |
| Comparative Example 13 | 0.1 | — | good | good | good | 200 | 3.3 | 67 | — | — | — |
| Example 17 | 0.1 | — | good | good | good | 200 | 0.2 | 77 | 380 | 3700 | 30500 |
| Example 18 | 0.1 | — | good | good | good | 200 | 0.4 | 70 | 290 | 3000 | 26000 |
| Example 19 | 0.2 | — | good | good | good | 200 | 0.4 | 71 | 270 | 3000 | 24000 |
| Example 20 | 0.1 | — | good | good | good | 200 | 0.3 | 68 | 280 | 2800 | 25000 |
| Example 21 | 0.1 | — | good | good | good | 200 | 0.3 | 69 | 290 | 2900 | 24000 |
| Example 22 | 0.1 | — | good | good | good | 200 | | | | | |
| Example 23 | 0.1 | — | good | good | good | 200 | 0.3 | 75 | 291 | 2980 | 25000 |

TABLE 2-continued

| | | | | | | | | | | |
|---|---|---|---|---|---|---|---|---|---|---|
| Example 24 | 0.1 | — | good | good | good | 200 | 0.4 | 64 | 310 | 2600 | 25000 |
| Example 25 | 0.1 | — | good | good | good | 200 | 0.2 | 76 | 400 | 3500 | 30000 |
| Example 26 | 0.1 | — | good | good | good | 200 | 0.3 | 80 | 280 | 2900 | 24000 |
| Comparative Example 14 | 0.1 | — | bad | — | — | — | — | — | — | — | — |
| Comparative Example 15 | 0.1 | — | good | good | good | 200 | 3.1 | 68 | 152 | 2107 | 5000 |
| Comparative Example 16 | 0.1 | — | bad | — | good | — | — | — | — | — | — |
| Comparative Example 17 | 0.1 | — | good | good | good | 200 | 2.0 | 66 | 120 | 2200 | 6000 |
| Comparative Example 18 | 0.1 | — | bad | — | — | — | — | — | — | — | — |
| Comparative Example 19 | 0.1 | — | good | bad | — | 200 | 4.0 | 68 | 200 | 2000 | 4000 |
| Comparative Example 20 | — | — | bad | — | — | — | — | — | — | — | — |
| Comparative Example 21 | 6 | — | bad | — | — | — | — | — | — | — | — |
| Comparative Example 22 | 0.1 | — | good | good | good | 200 | 0.2 | 6 | 72000 | 3 | 30000 |

EXAMPLE 27

A microporous polypropylene film was prepared in the same manner as described in Example 12 except that the filler was changed to a filler shown in Table 3. Incidentally, in Run No. 5 in Table 3, the resin used in Example 24 was used. The obtained results are shown in Table 3. The fillers used are described below.

Aluminum oxide
α-Alumina RA-40 supplied by Iwatani Kagaku Kogyo, average particle size=0.8μ

Titanium oxide
DE10097 supplied by Dainippon Ink Kagaku, average particle size=0.2μ

Barium carbonate
Barium Carbonate H supplied by Ballite Kogyo, average particle size=0.9μ

Magnesium hydroxide
Kisuma S-4 supplied by Kyowa Kagaku Kogyo, average particle size=0.4μ

Aluminum hydroxide
Hidilite H40 supplied by Tsuchiya Kaolin Kogyo, average particle size=0.7μ

Barium sulfate
Barium Sulfate #100 supplied by Sakai Kagaku, average particle size=0.6μ

TABLE 3

| Run No. | Filler kind | Filler amount (% by weight) | Mold-ability | Dispers-ibility | Stretch-ability | Thickness (μ) | Maximum pore size (μ) | Porosity (%) | Air Permeability (sec/100 cc) | Moisture Permeability (g/m² · 24 hrs) |
|---|---|---|---|---|---|---|---|---|---|---|
| 1 | Al₂O₃ | 60 | good | good | good | 200 | 0.9 | 65 | 250 | 2600 |
| 2 | TiO₂ | 60 | " | " | " | 200 | 0.5 | 70 | 140 | 2800 |
| 3 | BaCO₃ | 60 | " | " | " | 200 | 1.0 | 65 | 320 | 2600 |
| 4 | Mg(OH)₃ | 60 | " | " | " | 200 | 0.7 | 75 | 160 | 3000 |
| 5 | Al(OH)₃ | 60 | " | " | " | 200 | 0.8 | 72 | 160 | 2900 |
| 6 | BaSO₄ | 60 | " | " | " | 200 | 0.8 | 68 | 280 | 2700 |

EXAMPLE 28

A microporous film was prepared in the same manner as described in Example 12 except that a copolymer of propylene with other α-olefin shown in Table 4 was used instead of the polypropylene used in Example 12. The obtained results are shown in Table 5.

TABLE 4

| Run No. | Maker and Tradename | Density (g/cm³) | Intrinsic Viscosity (dl/g) at 135° C. in Tetralin | Melting Point (°C.) | Comonomer kind | Comonomer Amount (% by weight) |
|---|---|---|---|---|---|---|
| 1 | Tokuyama Soda, ME-230 | 0.91 | 1.92 | 158 | ethylene | 0.7 |
| 2 | Tokuyama Soda, MS-624 | 0.90 | 2.28 | 163 | ethylene | 4.7 |
| 3 | Tokuyama Soda, PN-835 | 0.90 | 2.10 | 165 | ethylene | 6.5 |
| 4 | Chisso, K-7014 | 0.90 | 2.05 | 163 | ethylene | 8.4 |
| 5 | Tokuyama Soda, TP-1 | 0.91 | 2.42 | 159 | butene-1 | 2.3 |

TABLE 5

| Run No. | Resin kind | Resin comonomer content (% by weight) | Mold-ability | Dispers-ibility | Stretch-ability | Thickness (μ) | Maximum pore size (μ) | Porosity (%) | Air-permeability (sec/100 cc) | Moisture permeability (g/m² · 24 hrs) |
|---|---|---|---|---|---|---|---|---|---|---|
| 1 | propylene/ethylene copolymer | 0.7 | good | good | good | 200 | 0.5 | 67 | 295 | 2900 |
| 2 | propylene/ethylene copolymer | 4.7 | " | " | " | 200 | 0.4 | 64 | 310 | 2600 |
| 3 | propylene/ethylene copolymer | 6.5 | " | " | " | 200 | 0.5 | 64 | 320 | 2400 |
| 4 | propylene/ethylene copolymer | 8.4 | " | " | " | 200 | 0.5 | 62 | 340 | 2400 |
| 5 | propylene/butene-1 copolymer | 2.3 | " | " | " | 200 | 0.5 | 69 | 280 | 3000 |

EXAMPLE 29

A filler-containing stretched film obtained in the example shown in Table 6 was immersed in an extracting solution shown in Table 6 under conditions shown in Table 6 to extract the contained filler. The physical properties of the obtained microporous polypropylene film are shown in Table 6.

TABLE 6

| Run No. | Film (Example No.) | Extraction extracting solution | Extraction extracting conditions | Thickness ($\mu$) | Maximum pore size ($\mu$) | Porosity (%) | Air permeability (sec/100 cc) | Moisture permeability (g/m$^2$ · 24 hrs) |
|---|---|---|---|---|---|---|---|---|
| 1 | 1 | 40% NaOH solution | 50° C., 24 hours | 180 | 0.3 | 84 | 225 | 2400 |
| 2 | 2 | 40% NaOH solution | 50° C., 24 hours | 180 | 0.4 | 79 | 248 | 2370 |
| 3 | 3 | 40% NaOH solution | 50° C., 24 hours | 180 | 0.5 | 74 | 210 | 2240 |
| 4 | 12 | 12N HCl/methanol (volume ratio = 50/50) | 25° C. 24 hours | 180 | 0.3 | 78 | 310 | 3300 |
| 5 | 17 | 12N HCl/methanol (volume ratio = 50/50) | 25° C. 24 hours | 170 | 0.2 | 79 | 400 | 3400 |
| 6 | 22 | 12N HCl/methanol (volume ratio = 50/50) | 25° C. 24 hours | 180 | 0.3 | 75 | 210 | 3100 |
| 7 | 25 | 12N HCl/methanol (volume ratio = 50/50) | 25° C. 24 hours | 180 | 0.3 | 78 | 370 | 3300 |
| 8 | 26 | 12N HCl/methanol (volume ratio = 50/50) | 25° C. 24 hours | 170 | 0.3 | 79 | 270 | 2800 |

COMPARATIVE EXAMPLE 23

The procedures of Example 12 were repeated in the same manner except that a surface active agent shown in Table 7 was used instead of the fluorine type surface active agent used in Example 12. Surface active agents shown in Table 7 are described below.
Anionic surface active agent
  KAO Pelex OT-P supplied by Kao Soap
Cationic surface active agent
  Cation PB-40 supplied by Nippon Yushi
Nonionic surface active agent
  Span 20 supplied by Kao Soap (HLB=8.6)
Nonionic surface active agent
  Span 80 supplied by Kao Soap (HLB=4.3)
Nonionic surface active agent
  Tween 20 supplied by Kao Soap (HLB=16.7)

We claim:

1. A microporous polypropylene film comprising a propylene homopolymer, a copolymer of propylene with other copolymerizable monomer or a blend thereof, which has an intrinsic viscosity ($\eta$) of 1.9 to 3.0 dl/g as measured at 135° C. in tetralin, said microporous film having a network structure comprising intercommunicating pores having a maximum pore size smaller than 1$\mu$ and an average pore size of 0.005 to 0.6$\mu$ and having a porosity of 30 to 90%, an air permeability of 5 to 500 sec/100 cc and a thickness of 5 to 200$\mu$, said microporous film being molecularly oriented by stretching.

2. A microporous polypropylene film as set forth in claim 1, wherein the copolymer of propylene with other copolymerizable monomer is a copolymer comprising at least 90% by weight of propylene and up to 10% of other $\alpha$-olefin.

3. A microporous polypropylene film as set forth in claim 1, wherein said microporous film is stretched so that the area stretching ratio is 1.5 to 30.

4. A microporous polypropylene film as set forth in claim 1, wherein said microporous film is stretched in the longitudinal direction at a stretching ratio of at least 1.5.

5. A microporous polypropylene film as set forth in claim 1, wherein said microporous film is bi-axially stretched at a stretching ratio of at least 1.5 in the longitudinal direction and at a stretching ratio of at least 1.5 in the lateral direction.

TABLE 7

| Run No. | Surface Active Agent kind | Surface Active Agent amount (% by weight) | Moldability | Dispersibility | Stretchability | Thickness ($\mu$) | Maximum pore size (u) | Porosity (%) | Air permeability (sec/100 cc) | Moisture permeability (g/m$^2$ · 24 hrs) |
|---|---|---|---|---|---|---|---|---|---|---|
| 1 | anionic | 3.5 | fair | bad | — | — | — | — | — | — |
| 2 | cationic | 2.0 | fair | bad | — | — | — | — | — | — |
| 3 | nonionic (HLB = 4.3) | 3.5 | bad | — | — | — | — | — | — | — |
| 4 | nonionic (HLB = 8.6) | 3.5 | bad | — | — | — | — | — | — | — |
| 5 | Nonionic (HLB = 16.7) | 3.5 | bad | — | — | — | — | — | — | — |

6. A microporous polypropylene film as set forth in claim 1, wherein said microporous film is thermally set after stretching.

7. A microporous polypropylene film as set forth in claim 1, wherein the propylene homopolymer or copolymer has an intrinsic viscosity of 1.9 to 3.0 as measured at 135° C. in tetralin.

8. The microporous polypropylene film as set forth in claim 1, wherein said intrinsic viscosity ($\eta$) is 2.0 to 3.0 dl/g.

9. The microporous polypropylene film as set forth in claim 2, wherein said other $\alpha$-olefin is ethylene or butene.

10. The microporous polypropylene film as set forth in claim 4, wherein said stretching ratio is from 3 to 7.

11. The microporous polypropylene film as set forth in claim 5, wherein said stretching ratio in the longitudinal direction is from 2 to 5 and said stretching ratio in the lateral direction is from 2 to 7.

12. A process for the preparation of a microporous polypropylene film, which comprises melt-forming into a sheet or film a mixture comprising (a) 20 to 80% by weight of a propylene homopolymer, a copolymer of propylene with other copolymerizable monomer or a blend thereof, which has an intrinsic viscosity ($\eta$) of 1.9 to 3.0 as measured at 135° C. in tetralin, (b) 80 to 20% by weight of at least one siliceous filler selected from the group consisting of silica, silicates and inorganic composites thereof, said siliceous filler having an average particle size smaller than 1$\mu$, (c) a polyester type plasticizer and/or an epoxy type plasticizer in an amount of 40 to 10% by weight based on the sum of the components (a) and (b), and (d) a silane type dispersant in an amount of 0.01 to 5% by weight based on the sum of the components (a), (b) and (c), and stretching the sheet or film at an area stretching ratio of 1.5 to 30.

13. A process for the preparation of a microporous polypropylene film, which comprises melt-forming into a sheet or film a mixture comprising (a) 30 to 70% by weight of a propylene homopolymer, a copolymer of propylene with other copolymerizable monomer or a blend thereof, which has an intrinsic viscosity ($\eta$) of 1.9 to 3.0 as measured at 135° C. in tetralin, (b') 70 to 30% by weight of at least one nonsiliceous filler selected from the group consisting of oxides, hydroxides, carbonates and sulfates of metals of groups IIA, IIIA and IVB of the Periodic Table, said nonsiliceous filler having an average particle size smaller than 1$\mu$, (c) a polyester type plasticizer and/or an epoxy type plasticizer in an amount of 0.1 to 5% by weight based on the sum of the components (a) and (b'), (e) a liquid or waxy hydrocarbon polymer in an amount of 0 to 10% by weight based on the sum of the components (a) and (b'), and (f) a fluorine type surface active agent in an amount of 0.01 to 5% by weight based on the sum of the components (a) and (b') and stretching the sheet or film at an area stretching ratio of 1.5 to 30.

14. A process for the preparation of a microporous polypropylene film according to claim 12, wherein the streched film is treated with a liquid medium capable of leaching the siliceous filler to remove at least a part of the siliceous filler from the film.

15. A process for the preparation of a microporous polypropylene film according to claim 13, wherein the stretched film is treated with a liquid medium capable of leaching the nonsiliceous filler to remove at least a part of the nonsiliceous filler from the film.

16. The process according to claim 10, wherein said liquid medium capable of leaching said siliceous filler comprises an aqueous solution of a caustic alkali.

17. The process according to claim 11, wherein said liquid medium capable of leaching said nonsiliceous filler comprises an aqueous solution of an acid or a mixture of an aqueous solution of an acid and an alcohol.

18. The process according to claim 8, wherein said average particle size of said siliceous filler is less than 0.5$\mu$.

19. The process according to claim 8, wherein said siliceous filler is selected from the group consisting of hydrous silicic acid, silicic anhydride, aluminum silicate, calcium silicate, magnesium silicate, siliceous sand, siliceous clay and siliceous talc.

20. The process according to claim 8, wherein said polyester type plasticizer comprises the esterification product of a linear or aromatic ring-containing dibasic or tribasic acid having 4 to 8 carbon atoms with a linear dihydric alcohol having 2 to 5 carbon atoms.

21. The process according to claim 8, wherein said epoxy type plasticizer comprises the epoxidation product of epoxidizing a double bond of a monobasic linear unsaturated acid having 16 to 18 carbon atoms.

22. The process according to claim 8, wherein said silane type dispersant comprises an alkoxy silane compound of the formula

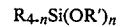

$$R_{4-n}Si(OR')_n$$

wherein R and R' are, independently, methyl, ethyl or propyl and n is 2 or 3.

23. The process according to claim 8, wherein said stretching is performed at a temperature 10° to 60° C. lower than the melting point of polypropylene.

24. The process according to claim 8, wherein subsequent to said stretching step, said stretched film is heated to a temperature of 100° to 160° C. and then cooled to room temperature.

25. The process according to claim 9, wherein said average particle size of said nonsiliceous filler is less than 0.5.

26. The process according to claim 9, wherein said nonsiliceous filler is selected from the group consisting of calcium oxide, magnesium oxide, barium oxide, aluminum oxide, boron oxide, titanium oxide, zirconium oxide, calcium carbonate, magnesium carbonate, barium carbonate, magnesium hydroxide, calcium hydroxide, aluminum hydroxide, calcium sulfate, barium sulfate and aluminum sulfate.

27. The process according to claim 9, wherein said polyester type plasticizer comprises the esterification product of a linear or aromatic ring-containing dibasic or tribasic acid having 4 to 8 carbon atoms with a linear dihydric alcohol having 2 to 5 carbon atoms.

28. The process according to claim 9, wherein said epoxy type plasticizer comprises the epoxidation product of epoxidizing a double bond of a monobasic linear unsaturated acid having 16 to 18 carbon atoms.

29. The process according to claim 9, wherein said liquid or waxy hydrocarbon polymer comprises hydroxyl-containing polybutadiene, polybutene, polyisoprene or hydrogenation products thereof.

30. The process according to claim 9, wherein said fluorine type surface active agent comprises a potassium or ammonium salt of an alkylcarboxylic acid or an alkylsulfonic acid having 6 to 8 carbon atoms wherein at least a portion of the hydrogen atoms in the alkyl group are substituted by fluorine, fluorinated alkyl quaternary ammonium iodides or esters of fluorinated alkyl carboxylic or sulfonic acids with monohydric or polyhydric alcohols having 1 to 4 carbon atoms.

* * * * *